(12) United States Patent
Miura et al.

(10) Patent No.: US 11,869,538 B2
(45) Date of Patent: Jan. 9, 2024

(54) METHOD FOR MANUFACTURING GLASS SPACER, GLASS SPACER, AND HARD DISK DRIVE DEVICE

(71) Applicant: HOYA CORPORATION, Tokyo (JP)

(72) Inventors: Masafumi Miura, Chaing Mai Province (TH); Kazuaki Hashimoto, Akiruno (JP); Naoyuki Higuchi, Kokubunji (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 17/909,583

(22) PCT Filed: Mar. 8, 2021

(86) PCT No.: PCT/JP2021/008935
§ 371 (c)(1),
(2) Date: Jan. 3, 2023

(87) PCT Pub. No.: WO2021/177468
PCT Pub. Date: Sep. 10, 2021

(65) Prior Publication Data
US 2023/0223047 A1 Jul. 13, 2023

Related U.S. Application Data

(60) Provisional application No. 62/986,005, filed on Mar. 6, 2020.

(51) Int. Cl.
*G11B 17/02* (2006.01)
*G11B 23/03* (2006.01)
*G11B 5/73* (2006.01)

(52) U.S. Cl.
CPC ........ *G11B 17/021* (2013.01); *G11B 5/73921* (2019.05); *G11B 23/03* (2013.01)

(58) Field of Classification Search
None
See application file for complete search history.

(56) References Cited

U.S. PATENT DOCUMENTS 5,724,208 A * 3/1998 Yahata ................. G11B 17/038
5,969,902 A 10/1999 Okumura et al.
(Continued)

FOREIGN PATENT DOCUMENTS

| CN | 110651327 A | 1/2020 |
| CN | 111095406 A | 5/2020 |

(Continued)

OTHER PUBLICATIONS

International Search Report in PCT/JP2021/008935 dated Jun. 1, 2021.

*Primary Examiner* — William J Klimowicz
(74) *Attorney, Agent, or Firm* — Global IP Counselors, LLP

(57) ABSTRACT

A method for manufacturing a ring-shaped glass spacer to be arranged in contact with a magnetic disk in a hard disk drive device includes processing for forming a film on the surface of a glass spacer main body, which is the base of the glass spacer. In the processing, the film is formed by passing the glass spacer main body through a location where the components of the film are in a spray state while an outer circumferential edge surface of the glass spacer main body is being rotated in a circumferential direction thereof.

11 Claims, 3 Drawing Sheets

(56) References Cited

U.S. PATENT DOCUMENTS

| | | | |
|---|---|---|---|
| 10,783,921 B2* | 9/2020 | Takano | G11B 5/65 |
| 10,872,635 B2* | 12/2020 | Takano | G11B 25/04 |
| 11,227,634 B1* | 1/2022 | Suzuki | G11B 19/2045 |
| 2003/0175471 A1* | 9/2003 | Kaneko | G11B 17/038 |
| 2003/0179494 A1* | 9/2003 | Kaneko | G11B 17/038 |
| 2006/0039080 A1* | 2/2006 | Kaneko | G11B 17/038 360/99.12 |
| 2015/0104735 A1 | 4/2015 | Umezawa et al. | |
| 2020/0211596 A1 | 7/2020 | Takano et al. | |
| 2020/0227087 A1* | 7/2020 | Eda | G11B 17/021 |
| 2020/0395046 A1 | 12/2020 | Takano et al. | |
| 2021/0221729 A1 | 7/2021 | Sato et al. | |
| 2021/0264946 A1 | 8/2021 | Eda et al. | |
| 2021/0407551 A1* | 12/2021 | Suzuki | G11B 17/038 |
| 2022/0157340 A1 | 5/2022 | Takano et al. | |

FOREIGN PATENT DOCUMENTS

| | | | | |
|---|---|---|---|---|
| JP | H0944969 A | | 2/1997 | |
| JP | H1074350 A | * | 3/1998 | G11B 17/021 |
| JP | 2003272336 A | | 9/2003 | |
| JP | 2005103652 A | * | 4/2005 | |
| JP | 2005320568 A | * | 11/2005 | |
| JP | 2007095205 A | * | 4/2007 | |
| JP | 2009108419 A | | 5/2009 | |
| JP | 2019125413 A | | 7/2019 | |
| WO | 2019151459 A1 | | 8/2019 | |
| WO | WO-2019151459 A1 | * | 8/2019 | G11B 17/021 |
| WO | 2019221102 A1 | | 11/2019 | |

* cited by examiner

METHOD FOR MANUFACTURING GLASS SPACER, GLASS SPACER, AND HARD DISK DRIVE DEVICE

CROSS-REFERENCE TO RELATED APPLICATIONS

This U.S. National stage application of International Patent Application No. PCT/JP2021/008935, filed on Mar. 8, 2021, which, in turn, claims priority to U.S. Provisional Patent Application No. 62/986,005, filed on Mar. 6, 2020. The entire contents of U.S. Provisional Patent Application No. 62/986,005 and International Patent Application No. PCT/JP2021/008935 are hereby incorporated herein by reference.

BACKGROUND

Field of the Invention

The present invention relates to a method for manufacturing a ring-shaped glass spacer to be arranged in contact with a magnetic disk in a hard disk drive device, a glass spacer, and a hard disk drive device provided with the glass spacer.

Background Information

Following the expansion of cloud computing in recent years, many hard disk drive devices (hereinafter also referred to as HDD devices) are used in data centers for a cloud in order to increase the storage capacity.

Ring-shaped spacers are provided between magnetic disks installed in an HDD device in order to keep the magnetic disks spaced apart from each other. These spacers function to keep the magnetic disks from coming into contact with each other and precisely position the magnetic disks at predetermined positions spaced apart from each other. Conventionally, metal materials with low manufacturing costs have been used as the material of these spacers.

Incidentally, when a glass substrate is used as a substrate for a magnetic disk, spacers and magnetic disks are in contact with each other, and thus, a change in the temperature in an HDD device results in a large difference occurring in the thermal expansion between a spacer made of metal and a magnetic disk made of glass, and thus the magnetic disk bends. As a result, the float properties of the magnetic head deteriorate. Deterioration in the float properties of the magnetic head is not preferable from the viewpoint of reading and writing performed by the hard disk device. Therefore, in recent years, use of a spacer made of glass (hereinafter referred to as a "glass spacer") has been studied considering a case where a glass substrate is used as a substrate for a magnetic disk.

However, in general, glass is an insulator, and thus static electricity is likely to accumulate on the magnetic disks or the glass spacer due to friction between the magnetic disks and the glass spacers that rotate at high speeds and air, and the like. This is not preferable because, if the magnetic disks or the spacers are charged, foreign matter and minute particles are likely to be adsorbed, and a recording element or a reproducing element of a magnetic head may break as a result of the accumulated static electricity being discharged to the magnetic head.

To address this, a glass spacer in which at least a contact surface of the glass spacer that is in contact with the magnetic disk and an inner circumferential surface of the glass spacer is coated with a conductive ceramic film having a film thickness of 0.1 to 3 μm is known (JP H9-44969A).

It is described that this can efficiently dissipate static electricity charged on the magnetic disk, and the contact surface is thus unlikely to be worn.

SUMMARY

However, if a brittle material such as glass or a ceramic material is used as the material of a spacer main body, there have been cases where, even when a conductive coating film is formed on the surface of the spacer main body, a portion of the brittle material of the spacer main body becomes minute particles, and dust is generated.

In view of this, the present invention aims to provide a glass spacer that is capable of inhibiting a magnetic disk or a glass spacer from being charged in order to inhibit discharge of static electricity charged on the magnetic disk in an HDD device to the magnetic head, and suppressing generation of dust, a hard disk drive device in which this glass spacer is used, and a method for manufacturing a glass spacer.

One aspect of the present invention is a method for manufacturing a ring-shaped glass spacer to be arranged in contact with a magnetic disk in a hard disk drive device.

The glass spacer is configured by forming a film on a glass spacer main body.

This manufacturing method includes processing for forming the film on a surface of the glass spacer main body, and in the processing, the film is formed by passing the glass spacer main body through a location where a component of the film is in a spray state while an outer circumferential edge surface of the glass spacer main body is being rotated in a circumferential direction thereof.

It is preferable that the outer circumferential edge surface is rotated by inserting a rotary shaft configured to loosely fit to a hole in the ring-shaped glass spacer main body into the hole, bringing the rotary shaft into contact with a portion of an inner circumferential edge surface of the hole, and rotating the rotary shaft.

It is preferable that the rotary shaft is provided on a moving mechanism such that the rotary shaft moves in one direction while the rotary shaft is being rotated.

It is preferable that the location of the spray state is realized by mist-spraying the component of the film from two sides of the path along which the glass spacer main body is transported.

It is preferable that the processing includes heating of the film formed on the glass spacer main body.

It is preferable that a surface of the film has an arithmetic average roughness Ra of 1 μm or less.

It is preferable that the surface resistivity of the film at 22 [° C.] ranges from $10^{-4}$ to $10^{6}$ [Ω/sq].

The film contains at least one of tin oxide, zinc oxide, and titanium oxide, for example.

Another aspect of the present invention is an apparatus for forming a film on a surface of a spacer for a hard disk drive device, the apparatus including a housing that is provided with at least a drive motor and a spray port, and that includes a built-in spacer transport means in which a rotary shaft is laid across a pair of moving mechanisms.

Another aspect of the present invention is also a ring-shaped glass spacer to be arranged in contact with a magnetic disk in a hard disk drive device. The entire surface that includes a main surface and an edge surface of the glass spacer is covered by a film that contains at least one of tin oxide, zinc oxide, and titanium oxide, and the thickness of the film on the edge surface of the glass spacer is larger than the thickness of the film on the main surface of the glass spacer.

It is preferable that the difference between the largest film thickness and the smallest film thickness of the film on the entire surface of the glass spacer is less than half of the largest film thickness.

It is preferable that the entire surface of the glass spacer is covered by the film having a thickness of less than 100 nm.

It is preferable that the arithmetic average roughness Ra of the edge surface of the glass spacer is larger than the arithmetic average roughness Ra of the main surface of the glass spacer.

It is preferable that the surface resistivity of the film at 22 [° C.] ranges from $10^{-4}$ to $10^6$ [Ω/sq].

Another aspect of the present invention is a hard disk drive device including the glass spacer and the magnetic disk.

According to the above-described glass spacer, hard disk drive device, and method for manufacturing a glass spacer, it is possible to inhibit the magnetic disk and the glass spacer from being charged, and to suppress the generation of dust.

DETAILED DESCRIPTION OF THE EMBODIMENTS

The following describes a glass spacer, a hard disk drive device, and a method for manufacturing a glass spacer according to the present invention in detail.

Figure 1:
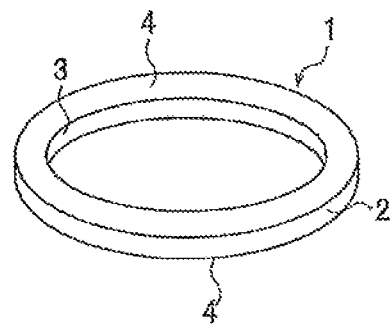
FIG. 1 is an external perspective view of a spacer according to one embodiment.
Figure 2:
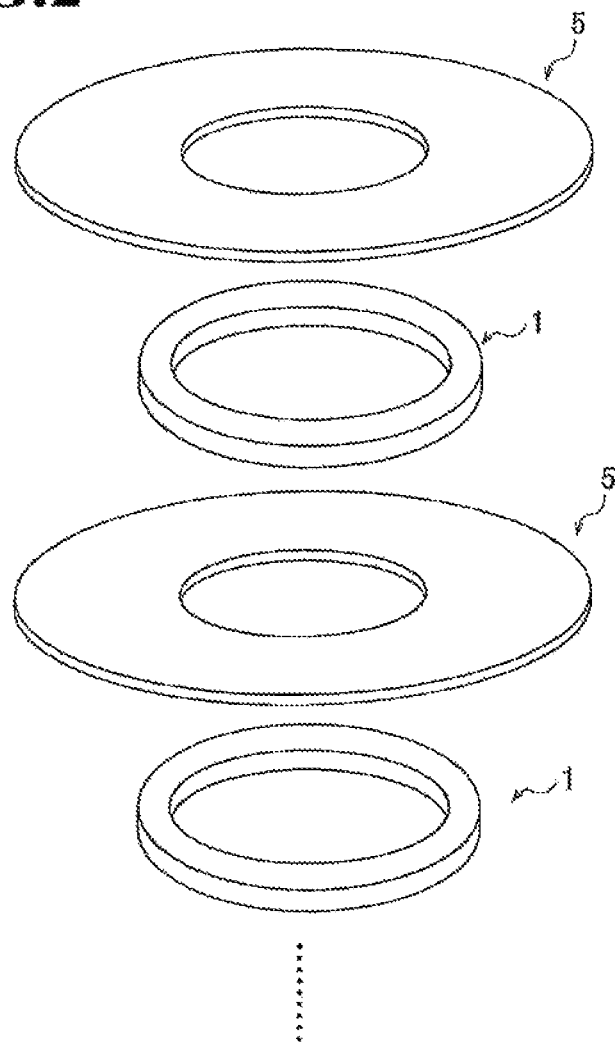
FIG. 2 is a diagram showing an arrangement of spacers according to one embodiment and magnetic disks.
Figure 3:
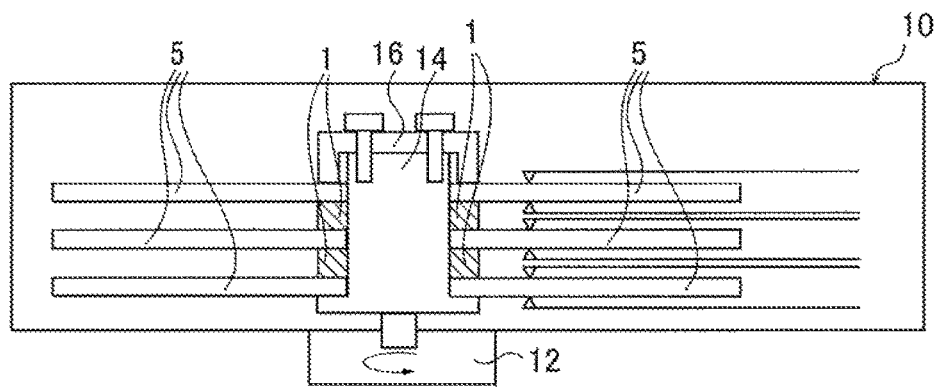
FIG. 3 is a cross-sectional view showing a main portion of an exemplary structure of an HDD device in which spacers according to one embodiment, are installed.
Figure 4:
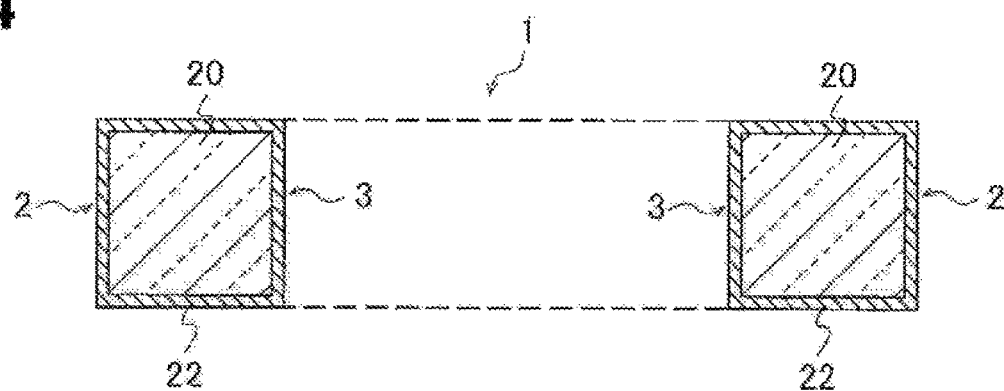
FIG. 4 is a cross-sectional view of an exemplary glass spacer according to one embodiment.

FIG. 1 is an external perspective view of a glass spacer (may simply be referred to as a "spacer" hereinafter) 1 according to one embodiment, and FIG. 2 is a diagram showing an arrangement of the spacers 1 and magnetic disks 5. FIG. 3 is a cross-sectional view showing a main portion of an exemplary structure of an HDD device in which the spacers 1 are installed. FIG. 4 is a cross-sectional view of an exemplary spacer 1.

The spacers 1 are installed in an HDD device by alternately stacking the magnetic disks 5 and the spacers 1 on each other as shown in FIG. 2. As shown in FIG. 3, the plurality of magnetic disks 5 are fitted onto a spindle 14 that is connected to a motor 12 and rotates, such that the spacers 1 are interposed between the magnetic disks 5, and the magnetic disks 5 are fixed using screws via a top clamp 16 that is located above the magnetic disks 5, and thus the magnetic disks 5 are attached at predetermined intervals.

As shown in FIG. 2, the spacers 1 and the magnetic disks 5 are alternately arranged such that one spacer 1 is located between two magnetic disks 5, and the spacers 1 keep a gap between adjacent magnetic disks 5 at a predetermined distance. Note that, although the spacer 1 described in the following embodiment is provided between two magnetic disks 5 while being in contact therewith, the present invention also applies to a spacer that is in contact with only the uppermost or lowermost magnetic disk 5. Note that there are also cases in which no spacer 1 that is in contact with only the uppermost or lowermost magnetic disk 5 is provided, depending on the specifications of the HDD device.

As shown in FIG. 1, the spacer 1 has a ring shape and includes an outer circumferential edge surface 2, an inner circumferential edge surface 3, and main surfaces 4 that are opposite to each other.

The inner circumferential edge surface 3 is a surface that comes into contact with the spindle 14, and is a wall surface surrounding a hole whose inner diameter is slightly larger than the outer diameter of the spindle 14.

Although dimensions of the annular spacer 1 may be changed as appropriate according to the specifications of the HDD in which the spacer 1 is installed, if the spacer 1 is to be used in a nominal 3.5 inch HDD device, the outer diameter is 30 to 34 mm, for example, the inner diameter is 24 to 26 mm, for example, the width in a radial direction is 2 to 5 mm, for example, and the thickness is 0.5 to 3 mm, for example. Also, a chamfered surface may be provided at a connection portion between the outer circumferential edge surface 2, the inner circumferential edge surface 3, and the main surfaces 4. The cross-sectional shape of the chamfered surface may have a linear shape or an arc shape. With regard to dimensions of the chamfered surface, the width in the radial direction and width the thickness direction are each in a range of 0.01 to 0.5 mm, for example.

The main surfaces 4 are two surfaces that are parallel to each other and come into contact with the magnetic disks 5. The spacer 1 fixes the magnetic disks 5 using a frictional force while being in close contact with the magnetic disks 5. Because the spacer 1 and the magnetic disks 5 are in contact with each other in this manner, a difference occurs in thermal expansion between the spacer 1 and the magnetic disks 5 following a change in the temperature inside the HDD device, and positional shift occurs, and thus the spacer 1 and the magnetic disks 5 rub against each other. Accordingly, static electricity is likely to he generated on glass, which is an insulator. Further, static electricity is likely to be generated on the spacer 1 due to friction between air and the spacer 1 that is rotating at high speeds. Static electricity is not preferable because, if such static electricity is generated on the spacer 1 and the spacer 1 is charged, foreign matter and minute particles are likely to be adsorbed, and a recording element or a reproducing element of a magnetic head may break as a result of the accumulated static electricity being discharged to the magnetic head. Also, a portion of the glass may become microparticles and the microparticles may be emitted as dust from the surface of the spacer 1. The generation of dust is not preferable because, as a result of the generation of dust, microparticles float in a closed space of the HDD device and adhere to the main surfaces of the magnetic disks 5, which hinder the magnetic head from reading from the magnetic disks 5 and writing to the magnetic disks 5. In particular, such dust is likely to be generated from the outer circumferential edge surface of the spacer 1. This is because the outer circumferential edge surface is always exposed during operation of the HDD device, and is close to the main surfaces of the magnetic disk 5. Also, when the spacer 1 is mounted on a spindle, the inner circumferential edge surface of the spacer 1 may rub against the spindle and dust may be generated. The generation of dust is not preferable because dust may be transferred and adhere to the main surfaces of the magnetic disk 5 when a rework operation for replacing the magnetic disk 5 is performed.

Therefore, in order to suppress accumulation of static electricity and prevent the generation of dust, the entire surface of the spacer 1 is covered by a conductive film 22 containing tin oxide or zinc oxide. That is, as shown in FIG. 4, the spacer 1 has a ring-shaped glass spacer main body (hereinafter, referred to as a "spacer main body") 20 and a film 22. The film 22 may be a conductive film containing tin oxide ($SnO_2$) or zinc oxide (ZnO), for example. Further, the film 22 may be a film containing titanium oxide. The film may be an FTO film in which tin oxide is doped with fluorine, or an AZO film in which zinc oxide is doped with aluminum oxide ($Al_2O_3$). It is preferable that the thickness of the film 22 covering the entire surface of the spacer 1 is less than 100 nm.

Conventionally, PVD (Physical Vapor Deposition) such as sputtering, CVD (Chemical Vapor Deposition), a spray method or the like has been used to form a film. However, if such a film formation method is employed using a common method, there is a problem that a film cannot be fundamentally formed on a portion where a holding member (support member) for holding a spacer is in contact with the spacer. Thus, a film cannot be formed on a portion of the surface of the spacer because this portion is held by the holding member, and thus this portion remains exposed, and glass pieces may become microparticles and be emitted as dust from the exposed portion. in order to completely eliminate the exposed portion, a spacer on which a film is formed while the spacer is held by the holding member may be removed from a film forming apparatus, and second film formation may be performed in a state in which the region on which the film was formed is held by the holding member. However, because the film is formed twice, there is a problem that the film thickness becomes uneven by about 2 fold between the portion that was in contact with the holding member and the other portions, the film formation process becomes complicated, and the cost is increased.

In this embodiment, the entire surface of the spacer is covered by the film 22 containing tin oxide without using a conventional ding member as described above.

It is preferable that the thickness of the film 22 covering the entire surface of the spacer 1 is preferably 200 nm or less, and more preferably less than 100 nm. When the thickness thereof is more than 200 nm, manufacturing cost may become excessive. Also, when the thickness thereof is 100 nm or more, surface unevenness of the film 22 increases, and when a protruding portion on the film 22 comes into contact with the magnetic disk 5, the protruding portion may be pressed by the magnetic disk 5, and a portion of this protruding portion may come off from the surface of the film 22 and become microparticles, resulting in the generation of dust. Generated microparticles are not preferable because the microparticles may be transferred and adhere to the main surfaces of the magnetic disk during a rework operation.

Also, it is preferable that the thickness of the film 22 on the outer circumferential edge surface 2 and the inner circumferential edge surface 3 of the spacer 1 is larger than the thickness of the film 22 on the main surfaces 4 of the spacer 1. Because the film 22 on the outer circumferential edge surface 2 is exposed to a closed space in the HDD device, dust generated from the outer circumferential edge surface 2 needs to be suppressed. Therefore, the thickness of the film 22 on the outer circumferential edge surface 2 is made larger than the thickness of the film 22 on the main surfaces 4 of the spacer 1 such that the glass of the spacer main body 20 is not exposed to the closed space. On the other hand, the film 22 on the inner circumferential edge surface 3 rubs against the spindle 14, and thus is likely to generate dust. Thus, the thickness of the film 22 on the inner circumferential edge surface 3 is made larger than the thickness of the film 22 on the main surfaces 4 of the spacer 1. The thickness of the film 22 on the main surfaces 4 of the spacer 1 may be set to a range of 30 nm or more and 190 nm or less, for example, and is more preferably set to a range of 30 nm or more and 90 nm or less. Also, the thickness of the film 22 on the outer circumferential edge surface 2 and the inner circumferential edge surface 3 may be set to a range of 40 nm or more and 200 nm or less, for example, and is more preferably set to a range of 40 nm or more and less than 100 nm.

According to one embodiment, it is preferable that the arithmetic average roughness Ra of the outer circumferential edge surface 2 and the inner circumferential edge surface 3 of the spacer 1 is larger than the arithmetic average roughness Ra of the main surfaces 4 of the spacer 1. The adherence of the film 22 can be improved by increasing the arithmetic average roughness Ra of the outer circumferential edge surface 2 and inner circumferential edge surface 3 of the spacer 1. By doing this, film separation caused by film stress is less likely to occur even when the film thickness of the film 22 on the edge surfaces is larger than that on the main surfaces. By polishing the main surfaces 4 of the spacer 1 before forming a film, for example, the arithmetic average roughness Ra of the main surfaces 4 of the spacer 1 can be made smaller than that of the outer circumferential edge surface 2 or the inner circumferential edge surface 3. It is preferable that the arithmetic average roughness Ha of the main surfaces 4 of the spacer 1 is set to 1.0 μm or less. Also, it is preferable that the arithmetic average roughness Ra of the outer circumferential edge surface 2 and the inner circumferential edge surface 3 of the spacer 1 is set to 0.5 μm or more.

Further, according to one embodiment, it is preferable that the difference between the largest film thickness and the smallest film thickness of the film 22 on the entire surface of the spacer 1 is less than half of the largest film thickness. Also, this difference is more preferably less than 1/4 of the largest film thickness. If an extremely thin film 22 resulting from being held by a holding jig or the like is not present on the surface of the spacer 1, this difference can be calculated based on the thickness of the film on each of the main surfaces, the inner circumferential edge surface, and the outer circumferential edge surface of the spacer 1. The film thickness of the film on each surface can be referred to as the film thickness at a center portion of each surface, for example. By doing this, variation in the film thickness of the film 22 on the entire surface of the spacer 1 can be reduced. Therefore, it is possible to prevent being unable to suppress the generation of dust due to the film thickness being extremely small in a portion of the surface when a film having a predetermined film thickness is formed.

Figure 5:
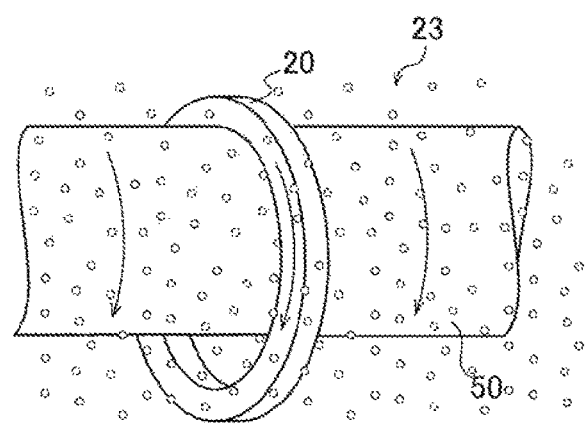
FIG. 5 is a diagram illustrating an example of the formation of a film using a method for manufacturing a glass spacer according to one embodiment.

Manufacturing of the spacer 1 provided with such a film 22 includes processing for thrilling the film 22 on the surface of the ring-shaped spacer main body 20, which is the base of the spacer 1. In the processing performed at this time, the film 22 is formed by passing the spacer main body 20 through the location where the components of the film 22 are in a spray state while the outer circumferential edge surface 2 of the spacer main body 20 is being rotated in a circumferential direction thereof. FIG. 5 is a diagram illustrating an example of the formation of a film using a method for manufacturing the spacer according to one embodiment.

It is possible to efficiently and evenly form the film 22 on the entire surface of the spacer main body 20 by passing the spacer main body 20 through the location where the components of the film 22 are in the spray state 23 while the outer circumferential edge surface 2 of the spacer main body 20 is being rotated in the circumferential direction. Conventionally, when an outer edge surface of the spacer main body 20 is held by a holding member, the film 22 is not formed on the held portion. After the 22 has been formed, the position of the held portion may be changed, and then the film 22 can be also formed a second time. However, the thickness of the film 22 becomes uneven. On the other hand, when the method for forming a film according to the present invention is used, the position of the holding member need not be changed, and the film 22 can be formed evenly through one instance of film formation processing.

In one embodiment of the method for forming the film 22, it is preferable to rotate the outer circumferential edge surface 2 by loosely fitting a rotary shaft 50 to a hole in the ring-shaped spacer main body 20, that is, by inserting the rotary shaft 50 a smaller outer diameter than the inner diameter of the hole, bringing a portion of the inner circumferential surface (the inner circumferential edge surface of the spacer main body 20) of the hole into contact with the rotary shaft 50, and rotating the rotary shaft 50. With this method, the spacer main body 20 is rotated in corotation with the rotary shaft 50. Thus, the surface roughness and the material of the rotary shaft 50 need only be designed as appropriate such that appropriate friction occurs between the rotary shaft 50 and the inner circumferential edge surface of the spacer main body 20. Further, a recessed portion (recess) or a protruding portion may be provided on the surface of the rotary shaft 50 such that the position of the spacer main body 20 does not shift in the axial direction of the rotary shaft during the corotation. By providing a recessed portion or a protruding portion, the number of ring-shaped spacer main bodies mounted on one rotary shaft can be easily increased, and thus production efficiency can be improved. By rotating the spacer main body 20 in the spray state 23, the components of the film 22 can be efficiently attached to the entire surface (the main surfaces 4, the outer circumferential edge surface 2, and the inner circumferential edge surface 3) of the spacer main body 20.

According to one embodiment, it is preferable that the rotary shaft 50 is provided on a moving mechanism 52 such that the rotary shaft 50 moves in one direction while the rotary shaft 50 is being rotated. It is possible to form the film 22 on the entire surface of the spacer main body 20 while the spacer main body 20 is rotated and transported by this spacer transport means in the spray state 23.

Figure 6:
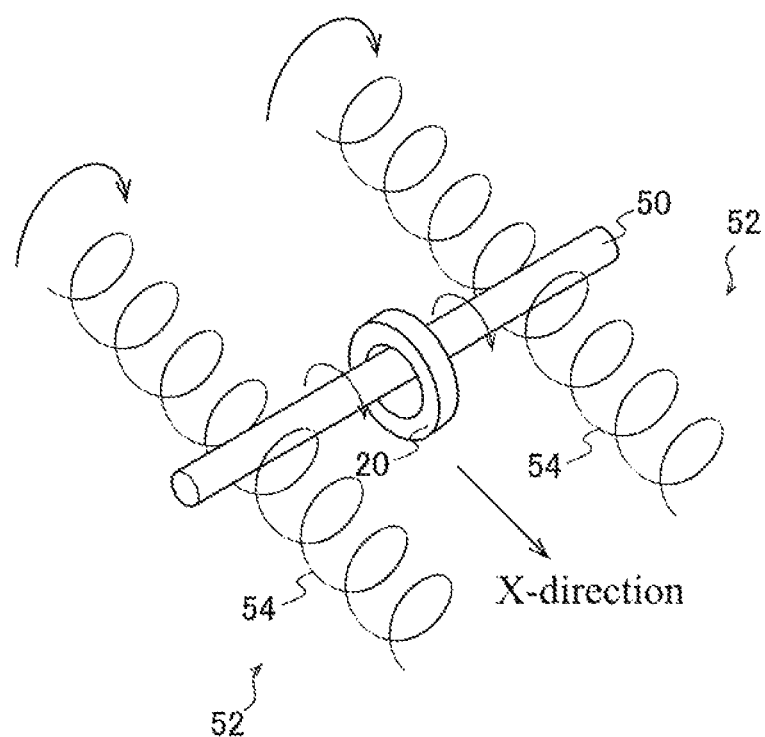
FIG. 6 is a diagram illustrating an exemplary spacer transport means used in a method for manufacturing a glass spacer according to one embodiment.

As shown in FIG. 6, for example, the moving mechanism 52 includes a pair of helically wound rotating members 54, and a drive motor (not shown). FIG. 6 is a diagram illustrating an exemplary spacer transport means used in a method for manufacturing a glass spacer according to one embodiment.

When the rotating members 54 shown in FIG. 6 are rotated by driving the drive motor, the rotary shaft 50, which is laid across the rotating members 54 on two sides, moves in an X-direction while the rotary shaft 50 rotates. Therefore, the rotating members 54 are disposed along the path along which the spacer main body 20 is transported.

According to one embodiment, the film 22 can be reliably formed on the entire surface of the spacer main body 20 by providing the spray states 23 at a plurality of locations, and passing the spacer main body 20 through the locations of the spray states 23 while transporting the spacer main body 20 using the moving mechanism 52.

According to one embodiment, it is preferable that the location of the spray state 23 is realized by mist-spraying the components of the film 22 from a plurality of spray ports provided to surround the path along which the spacer main body 20 is transported. The plurality of spray ports may be provided on two sides, left and right sides, upper and lower sides, and upper, lower, left, and right sides of the transport path, for example. Further, the plurality of spray ports may be provided along the path along which the spacer main body 20 is transported. Unevenness in the thickness of the film 22 can be suppressed by combining these as appropriate.

Processing for forming the film 22 may include heating of the film 22 formed on the spacer main body 20 using a heating means during and/or after the formation of the film 22. Note that the spacer main body 20 may be heated before the film 22 is formed, and then the film 22 may be heated using residual heat. That is, the film 22 can be heated by combining heating performed before, during, and after the film 22 is formed, as appropriate. When minute droplets adhere to the surface of the spacer main body 20 and a liquid film 22 is formed in the spray state 23 in which minute droplets are scattered, the film 22 is solidified through a chemical reaction caused by subjecting this film 22 to heat treatment, for example. It is preferable that the film 22 is a conductive oxide or ceramic material. If the film 22 is formed using tin oxide, for example, a liquid, which is obtained by dissolving an organotin compound such as dibutyltin diacetate or dimethyltin dichloride in a solvent such as ethanol, is brought into the spray state 23, and the film 22 is formed on the surface of the spacer main body 20 in this spray state 23 and then heated at 400 to 600° C., for example, thus forming tin oxide. Note that, as described above, the above spraying may be performed after the spacer main body 20 has been heated and/or while the spacer main body 20 is being heated. Conventionally known heating devices such as various heaters, heating plates, and the like may be used as a heating means.

Note that the spacer transport means shown in FIG. 6 as an example can be used to form the film on the surface of any spacer as well as a spacer made of glass. Therefore, an apparatus for forming a film that has a spacer transport means, which is shown in FIG. 6 as an example, built into in a housing provided with at least a drive motor and spray ports, and optionally a heating means can also form a film on the surface of a spacer for a hard disk drive device manufactured using any material.

It is preferable that the surface of the film 22 has an arithmetic average roughness Ra of 1 μm or less.

Is preferable that the surface resistivity of the film 22 at 22 [° C.] ranges from $10^{-4}$ to $10^6$ [Ω/sq]. By using such a material, the surface resistivity of the spacer 1 is low even when the spacer 1 or the magnetic disk 5 is charged, and thus a charge can flow from the spacer 1 via the spindle 14 or from the magnetic disk 5 via the spacer 1 and the spindle 14 to the outside of the spacer 1 and the magnetic disk 5, and it is possible to inhibit the spacer 1 and the magnetic disk 5 from being charged. The surface resistivity can be measured using a resistivity meter with a four-point probe method, for example.

The material of the film 22 is a tin-containing ceramic material that contains tin oxide or a zinc-containing ceramic material that contains zinc oxide, for example. Further, a material containing titanium oxide may be used. Also, a material obtained by doping such a substance with fluorine or aluminum oxide may be used. Because the film 22 made of these materials is conductive, the surface resistivity of the spacer 1 having the film 22 at 22 [° C.] can be set to $10^{-4}$ to $10^6$ [Ω/sq].

With the method for manufacturing the spacer 1, the film 22 is formed by passing the spacer main body 20 through the location where the components of the film 22 are in the spray state 23 while the outer circumferential edge surface of the spacer main body 20 is being rotated in a circumferential direction thereof in this manner. As a result, it is possible to form the film 22 on the entire surface of the spacer main body 20 and to evenly form the film 22. Also, because the entire surface is covered by the film 22, a portion where glass is exposed is eliminated, and thus the generation of dust can he suppressed. Further, because processing can be performed in an atmosphere, the film 22 can be formed cheaply, compared to PVD, CVD, or the like.

Note that the above-described method for manufacturing the spacer 1 is not, limited to the method for forming the film 22 by passing the spacer main body 20 through the location of the spray state 23 while rotating the outer circumferential edge surface of the spacer main body 20 in the circumferential direction thereof, and other manufacturing methods can also be used. The film 22 may be also formed on the entire surface of the spacer main body 20 by placing the spacer main body 20 on a table such as a heating plate, and performing spraying multiple times while changing the orientation of the spacer main body 20 and the spray method as appropriate, for example.

[Example 1]

A glass spacer having an outer diameter of 32 mm, an inner diameter of 25 mm, and a thickness of 2 mm was prepared. The arithmetic average roughnesses Ra of the main surfaces, the inner circumferential edge surface, and the outer circumferential edge surface of the glass spacer were respectively 0.3 μm, 0.8 μm, and 0.8 μm.

An apparatus for forming a film has a parallelepiped housing (chamber) structure in which a pair of rotating members (helical shape) provided with a rotary shaft and a drive motor are built in, and multiple spray nozzles and multiple lamp heaters are provide(on upper and lower surfaces at predetermined intervals. The spray nozzles and the lamp heaters were provided such that the film could he sufficiently formed even when a glass spacer was transported. The rotary shaft in the housing was inserted into the glass spacer, and the rotary shaft was laid across the pair of rotating members. The output of the lamp heaters was set such that the glass spacer was heated to 400° C., and an ethanol solution containing dibutyltin diacetate was sprayed into a specific region in the housing every 5 seconds so as to realize the spray state in a portion in the housing. Then, conditions for the drive motor and the like were set such that the transport speed of the glass spacer in the X-direction (see FIG. 6) was 10 cm/min, and the workpiece rotated at 3 rpm. As a result, the rotary shaft moved while the rotary shaft was rotated on the rotating member, and passed through the spray. The film was formed on the surface of the glass spacer while the glass spacer was heated and transported through the spray in this manner. The thicknesses of the tin oxide film formed on the main surfaces, the inner circumferential edge surface, and the outer circumferential edge surface of the glass spacer were respectively 70 nm, 82 nm, and 90 nm. Here, the thickness of the film on the edge surfaces was larger than the thickness of the film on the main surfaces. Also, because the difference between the largest film thickness and the smallest film thickness was 20 nm and the largest film thickness was 90 nm, it was found that the difference between the largest film thickness and the smallest film thickness of the film 22 on the entire surface of the spacer 1 was less than half and less than 1/4 of the largest film thickness, and variation in the film thickness was very small. Further, the arithmetic average roughnesses Ra of these surfaces were respectively 0.3 μm, 0.8 μm, and 0.8 μm. The surface resistivity of the glass spacer at 22 [° C.] after the tin oxide film was formed was in a range of $10^{-4}$ to $10^6$ [Ω/sq].

[Example 2]

A film was repeatedly formed on a glass spacer having the same size as the above glass spacer, in the same manner as above. A film that was thicker than that in Example 1 was formed by reducing the transport speed in the X-direction in the spray state. The thicknesses of the tin oxide film formed on the main surfaces, the inner circumferential edge surface, and the outer circumferential edge surface of the glass spacer were respectively 140 nm, 170 nm, and 188 nm. Here, the thickness of the film on the edge surfaces was larger than the thickness of the film on the main surfaces. Also, it was found that the difference between the largest film thickness and the smallest film thickness of the film 22 on the entire surface of the spacer 1 was less than half of the largest film thickness, and variation in the film thickness was small. Further, the arithmetic average roughnesses Ra of these surfaces were respectively 0.4 μm, 0.9 μm, and 1.0 μm.

[Example 3]

A film was repeatedly formed on a glass spacer having the same size as the above glass spacer, in the same manner as above. A film that was thinner than that in Example 1 was formed by increasing the transport speed in the X-direction in the spray state. The thicknesses of the tin oxide film formed on the main surfaces, the inner circumferential edge surface, and the outer circumferential edge surface of the glass spacer were respectively 40 nm, 47 nm, and 51 nm. Here, the thickness of the film on the edge surfaces was larger than the thickness of the film on the main surfaces. Also, it was found that the difference between the largest film thickness and the smallest film thickness of the film 22 on the entire surface of the spacer 1 was less than half and less than 1/4 of the largest film thickness, and variation in the film thickness was very small. Further, the arithmetic average roughnesses Ra of these surfaces were respectively 0.3 μm, 0.8 μm, and 0.8 μm.

[Reference Example]

A glass spacer that was the same as that in Example 1 was placed on a heating plate and heated to 400° C. An ethanol solution containing dibutyltin diacetate was sprayed from above while the temperature was maintained, such that the thickness of the film on the main surfaces reached 70 nm. Then, the glass spacer was turned over, placed on the heating plate, and heated to 400° C., and the ethanol solution containing dibutyltin diacetate was sprayed in the same manner. The thicknesses of the tin oxide film formed on the main surfaces, the inner circumferential edge surface, and the outer circumferential edge surface of the obtained glass spacer were respectively 70 nm, 140 nm, and 140 nm. Although the thickness of the film on the edge surfaces was larger than the thickness of the film on the main surfaces, the difference between the largest film thickness and the smallest film thickness was not less than half of the largest film thickness. That is, it was found that variation in the film thickness of the film 22 on the entire surface of the spacer 1 was very large. Further, the arithmetic average roughnesses Ra of these surfaces were respectively 0.3 μm, 0.9 μm, and 0.9 μm.

TABLE 1

|  | Ex. 1 | Ex. 2 | Ex. 3 | Reference Example |
|---|---|---|---|---|
| Thickness of film on main surface | 0 | 140 | 40 | 70 |
| Thickness of film on inner circumferential edge surface | 82 | 170 | 47 | 140 |
| Thickness of film on outer circumferential edge surface | 90 | 188 | 51 | 140 |
| Largest value-Smallest value | 20 | 48 | 11 | 70 |
| Largest value/2 | 45 | 94 | 25.5 | 70 |

Unit: nm

An HDD device was produced by sandwiching two spacers produced in Example 1 between three magnetic disks (having a main surface roughness Ra of 0.3 nm or less) as shown in FIG. 3. When operations such as signal recording and reproduction performed by a magnetic head were checked, no particular problems were observed. Also, when an HDD device was produced in the same manner for the spacers produced in Examples 2 and 3 and Reference Example and the operations thereof were checked, no particular problems were observed.

Although the glass spacer, the hard disk drive device, and the method for manufacturing a glass spacer of the present invention have been described in detail, the present invention is not limited to the above-described embodiments and examples, and it goes without saying that various modifications and changes can be made within a scope not departing from the gist of the present invention.

The invention claimed is:

1. A ring-shaped glass spacer to be arranged in contact with a magnetic disk in a hard disk drive device,
   wherein the entire surface that includes a main surface and an edge surface of the glass spacer is covered by a film that contains at least one of tin oxide, zinc oxide, and titanium oxide, and
   the thickness of the film on the edge surface of the glass spacer is larger than the thickness of the film on the main surface of the glass spacer.

2. The glass spacer according to claim 1,
   wherein the difference between the largest film thickness and the smallest film thickness of the film on the entire surface of the glass spacer is less than half of the largest film thickness.

3. The glass spacer according to claim 2,
   wherein the entire surface of the glass spacer is covered by the film having a thickness of less than 100 nm.

4. The glass spacer according to claim 3,
   wherein the arithmetic average roughness Ra of the edge surface of the glass spacer is larger than the arithmetic average roughness Ra of the main surface of the glass spacer.

5. The glass spacer according to claim 1,
   wherein the surface resistivity of the film at 22 (° C.) ranges from $10^{-4}$ to $10^6$ ($\Omega$/sq).

6. The glass spacer according to claim 2,
   wherein the arithmetic average roughness Ra of the edge surface of the glass spacer is larger than the arithmetic average roughness Ra of the main surface of the glass spacer.

7. The glass spacer according to claim 1,
   wherein the entire surface of the glass spacer is covered by the film having a thickness of less than 100 nm.

8. The glass spacer according claim 7,
   wherein the arithmetic average roughness Ra of the edge surface of the glass spacer is larger than the arithmetic average roughness Ra of the main surface of the glass spacer.

9. The glass spacer according to claim 1,
   wherein the arithmetic average roughness Ra of the edge surface of the glass spacer is larger than the arithmetic average roughness Ra of the main surface of the glass spacer.

10. The glass spacer according to claim 1, wherein the surface resistivity of the film at 22 (° C.) ranges from $10^{-4}$ to $10^6$ ($\Omega$/sq).

11. A hard disk drive device comprising:
    the glass spacer according to claim 1; and
    the magnetic disk.

* * * * *